US010302925B2

(12) United States Patent
Nakata et al.

(10) Patent No.: US 10,302,925 B2
(45) Date of Patent: May 28, 2019

(54) MICROSCOPE INCLUDING A VARIABLE-FOCUS OPTICAL SYSTEM DISPOSED BETWEEN A PHOTODETECTOR AND AN OBJECTIVE OPTICAL SYSTEM

(71) Applicant: OLYMPUS CORPORATION, Hachioji-shi, Tokyo (JP)

(72) Inventors: Tatsuo Nakata, Tokyo (JP); Kenichi Kusaka, Brookline, MA (US)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/793,660

(22) Filed: Oct. 25, 2017

(65) Prior Publication Data

US 2018/0136445 A1    May 17, 2018

(30) Foreign Application Priority Data

Nov. 11, 2016    (JP) ................................. 2016-220342

(51) Int. Cl.
  *G02B 21/00*  (2006.01)
  *G02B 21/02*  (2006.01)
  (Continued)

(52) U.S. Cl.
  CPC ........... *G02B 21/02* (2013.01); *G02B 21/002* (2013.01); *G02B 21/0076* (2013.01);
  (Continued)

(58) Field of Classification Search
  CPC .. G02B 21/00; G02B 21/002; G02B 21/0076; G02B 21/02; G02B 21/025; G02B 21/06;
  (Continued)

(56) References Cited

U.S. PATENT DOCUMENTS

2005/0200947 A1* 9/2005 Hirata ................ G02B 21/0004
                                                           359/368
2015/0153554 A1* 6/2015 Tamano ............... G02B 21/002
                                                           359/380
(Continued)

OTHER PUBLICATIONS

Leuenberger et al., "Focus-Tunable Lenses Enable 3-D Microscopy", BioPhotonics, vol. 22, Issue 3, Apr. 2015, Starting at p. 26, Online publication accessed Sep. 24, 2018, https://www.photonics.com/Articles/Focus-Tunable_Lenses_Enable_3-D_Microscopy/a57323.*

(Continued)

*Primary Examiner* — Stephone B Allen
*Assistant Examiner* — Adam W Booher
(74) *Attorney, Agent, or Firm* — Holtz, Holtz & Volek PC

(57) ABSTRACT

To provide a microscope including: an objective optical system that condenses light from a sample; a relay optical system that relays the light condensed by the objective optical system; a photodetector detects the light coming from the objective optical system and relayed by the relay optical system; and a variable-focus optical system disposed at a position between the photodetector and the objective optical system, the position being optically conjugate to a pupil of the objective optical system, the variable-focus optical system being capable of changing a focal position of the objective optical system in a direction along an objective optical axis.

17 Claims, 5 Drawing Sheets

(51) Int. Cl.
 *G02B 21/08* (2006.01)
 *G02B 21/24* (2006.01)
 *G02B 21/36* (2006.01)

(52) U.S. Cl.
 CPC .......... *G02B 21/025* (2013.01); *G02B 21/08* (2013.01); *G02B 21/24* (2013.01); *G02B 21/248* (2013.01); *G02B 21/361* (2013.01)

(58) Field of Classification Search
 CPC ...... G02B 21/08; G02B 21/24; G02B 21/241; G02B 21/248; G02B 21/36; G02B 21/361; G02B 7/28
 See application file for complete search history.

(56) References Cited

U.S. PATENT DOCUMENTS

2017/0160529 A1* 6/2017 Lippert ................. G02B 21/02
2017/0318216 A1* 11/2017 Gladnick ............... G02B 7/006

OTHER PUBLICATIONS

Jerry L. Chen, et al, "Online correction of licking-induced brain motion during two-photon imaging with a tunable lens," J. Physiol. 591.19 (2013), pp. 4689-4698.

* cited by examiner

MICROSCOPE INCLUDING A VARIABLE-FOCUS OPTICAL SYSTEM DISPOSED BETWEEN A PHOTODETECTOR AND AN OBJECTIVE OPTICAL SYSTEM

CROSS-REFERENCE TO RELATED APPLICATIONS

This application claims the benefit of Japanese Patent Application No. 2016-220342, the content of which is incorporated herein by reference.

TECHNICAL FIELD

The present invention relates to a microscope.

BACKGROUND ART

A microscope configured to change a focal length with a variable-focus optical system, such as an electrically tunable lens (ETL), has conventionally been known (see, for example, Non-Patent Literature 1).

According to the microscope, a focal position can be changed by the variable-focus optical system, without changing an operation distance of an objective lens.

CITATION LIST

Non-Patent Literature

{Non-Patent Literature 1}
"Online correction of licking-induced brain motion during two-photon imaging with a tunable lens" Jerry L. Chen et al., J. physical 591.19 (2013), pp 4689-4698

SUMMARY OF INVENTION

One aspect of the present invention provides a microscope including: an objective optical system that condenses light from a sample; a relay optical system that relays the light condensed by the objective optical system; a photodetector that detects the light coming from the objective optical system and relayed by the relay optical system; and a variable-focus optical system disposed at a position between the photodetector and the objective optical system, the position being optically conjugate to a pupil of the objective optical system, the variable-focus optical system being capable of changing a focal position of the objective optical system in a direction along an objective optical axis.

DESCRIPTION OF EMBODIMENTS

A microscope 1 according to one embodiment of the present invention will be described below with reference to the drawings.

Figure 1:
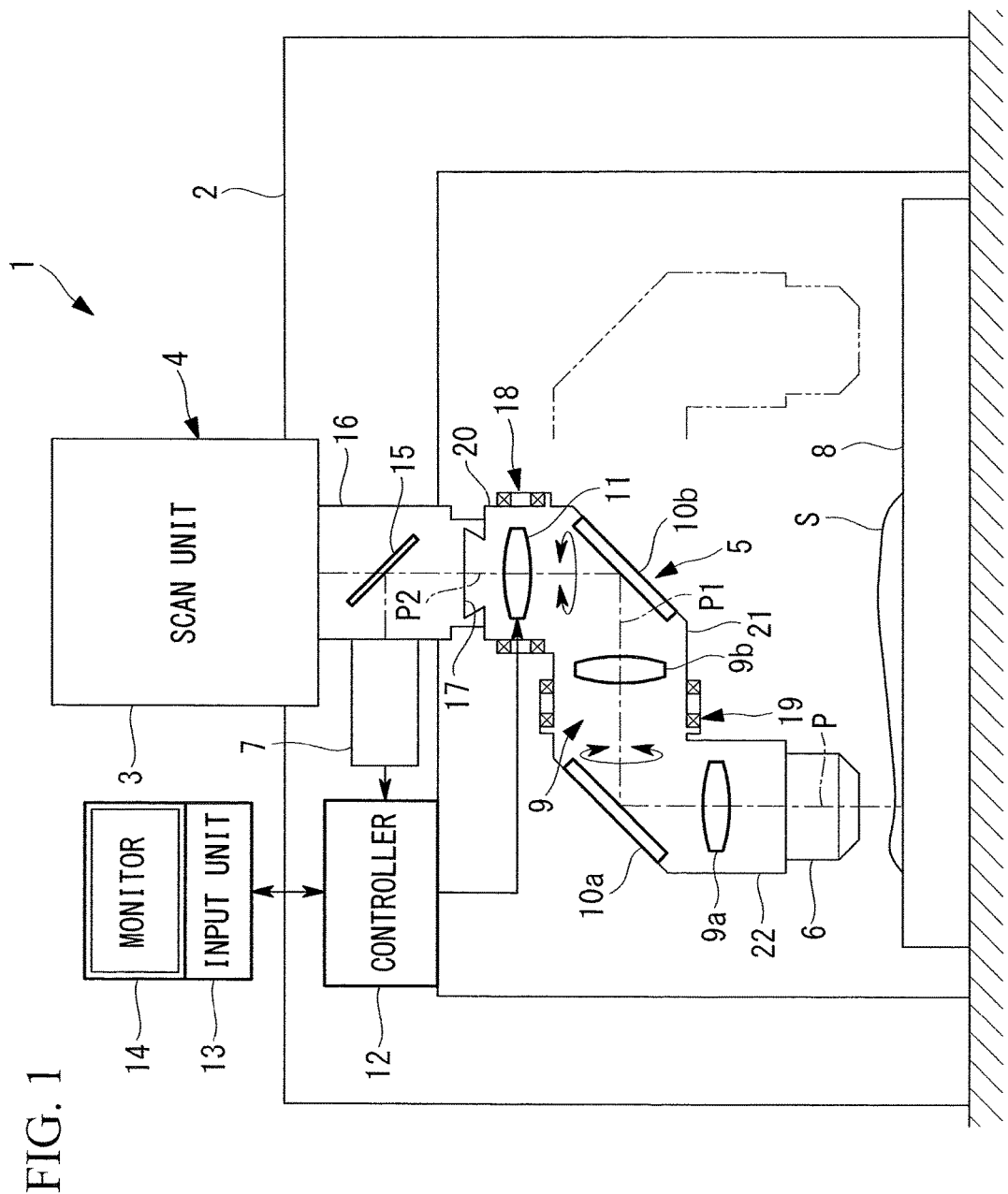
FIG. 1 is an overall configuration diagram illustrating a microscope according to one embodiment of the present invention.

The microscope 1 according to the present embodiment is a gate-type microscope supported by a gate-type structure member 2 as illustrated in FIG. 1. The microscope 1 includes a microscope body 4 including a scan unit 3 that two-dimensionally scans light from a light source (illustration omitted), an inner focus unit 5 detachably attached to the microscope body 4, an objective optical system 6 provided at the tip of the inner focus unit 5, an external detector (photodetector) 7 that detects the light condensed by the objective optical system 6, and a stage S on which a sample S is laid.

The gate-type structure member 2 is configured to secure wide space below the microscope body 4 and above the stage 8 in a vertical direction so as to prevent the inner focus unit 5 from interfering surrounding structures when the inner focus unit 5 operates for the microscope body 4.

The microscope body 4 is the microscope body of, for example, a two-photon laser scanning microscope or a laser scanning microscope including a galvano scanner as the scan unit 3, or a disk scanning confocal microscope including a pinhole array disk having a plurality of pinholes as the scan unit 3. The microscope body 4 is fixed to the gate-type structure member 2. The stage 8 is fixed to a vibration removal stand which is not illustrated.

As illustrated in FIG. 1, the inner focus unit 5 has the objective optical system 6 attached to a tip thereof. The inner focus unit 5 includes a relay optical system 9 that relays fluorescent light (observation light) from the sample S condensed by the objective optical system 6, reflective mirrors 10a and 10b that reflect the fluorescent light relayed by the relay optical system 9, and a variable-focus optical system 11 formed of an ETL.

The variable-focus optical system 11 can change the focal position of the objective optical system 6 in a direction along an objective optical axis P at high speed based on a driving signal from the controller 12, without mechanically moving the structures, such as the objective optical system 6 and the stage (for example, an inclined rotating XY stage) 8, in the vicinity of the sample S.

The controller 12 is connected to an input unit 13 formed of a personal computer, and a monitor 14, for example. An operator can input magnifying power information of the objective optical system 6 through the input unit 13, and adjust an observation position in the direction along the objective optical axis P while viewing an image of the sample S displayed on the monitor 14.

The controller 12 is configured to control the amount of movement of the focal position moved by the variable-focus optical system 11 in accordance with the magnifying power information of the objective optical system 6 input from the input unit 13. Accordingly, even though the magnification of the objective optical system 6 to be mounted varies, the focus can be moved by an equal distance in the direction along the objective optical axis P if the observation position adjusted and input by the operator is identical.

The inner focus unit 5 is detachably attached to a revolver arm 16 incorporating a dichroic mirror 15, and is connected to the scan unit 3 of the microscope body 4. The revolver arm 16 is provided with a dovetail revolver attaching unit 17 for detachably mounting a revolver which is not illustrated, the revolver retaining a plurality of objective lenses (illustration omitted) in a replaceable manner. The revolver attaching unit 17 is used to detachably attach the inner focus unit 5, instead of the revolver, to the revolver arm 16.

While transmitting laser light from the light source, the dichroic mirror 15 reflects the fluorescent light, which returns from the sample S through the inner focus unit 5, to the external detector 7.

The inner focus unit 5 includes two rotation mechanisms (for example, structures rotatably supported by bearing) 18 and 19. The first rotation mechanism 18 is configured to rotate a casing 21, which houses the objective optical system 6, the reflective mirrors 10a and 10b, and the relay optical system 9, around a rotating shaft P2 parallel to the objective optical axis P against a casing 20 which houses the variable-focus optical system 11. The second rotation mechanism 19 is configured to rotate a casing 22, which houses the objective optical system 6, a relay lens 9a that is one relay lens constituting the relay optical system 9, and the reflective mirror 10a, around a rotating shaft P1 perpendicular to the objective optical axis P against a casing 21 which houses the other relay lens 9b and the reflective mirror 10b.

Accordingly, the objective optical system 6 is rotated around the rotating shaft P2 parallel to the objective optical axis P and around the rotating shaft P1 perpendicular to the objective optical axis P, so that the sample S can be observed from various directions. In this case, even when the position and posture of the objective optical system 6 are changed by the first rotation mechanism 18 and the second rotation mechanism 19, the posture of the variable-focus optical system 11 is unchanged with its optical axis being fixed to be constantly provided in a vertical direction.

The operation of the thus-configured microscope 1 according to the present embodiment will be described below.

According to the microscope 1 in the present embodiment, the laser light emitted from the light source is two-dimensionally scanned in the scan unit 3, and passes through the dichroic mirror 15 in the revolver arm 16. The laser light is then condensed on the sample S through the variable-focus optical system 11, the reflective mirrors 10a and 10b, the relay optical system 9, and the objective optical system 6. As a result, fluorescent light is generated at the focal position of the objective optical system 6.

The generated fluorescent light is condensed by the objective optical system 6, and is split by the dichroic mirror 15 in the middle of returning via the relay optical system 9, the reflective mirrors 10a and 10b, and the variable-focus optical system 11. The fluorescent light is then detected by the external detector 7, imaged by the controller 12, and is displayed on the monitor 14.

When the operator operates the input unit 13 to change a depth position of the sample S to be observed, while viewing the image on the monitor 14, a driving signal is sent to the variable-focus optical system 11 from the controller 12, and the focal position of the objective optical system 6 is changed in the direction along the objective optical axis P.

In this case, in the microscope 1 according to the present embodiment, the variable-focus optical system 11 is disposed at a position optically conjugate to a pupil poison of the objective optical system 6. This makes it possible to keep a visual field range unchanged even when the variable-focus optical system 11 is operated to change the focal position. That is, the microscope 1 provides an advantage that the variable-focus optical system 11 can easily change the depth position to be observed without changing the position of the objective optical system 6 or the stage 8, and without changing the visual field range. The inner focus unit 5 can also easily be mounted without modifying each component member, such as the revolver arm 16 and the scan unit 3, generally included in the microscope.

In the present embodiment, the inner focus unit 5 includes two rotation mechanisms 18 and 19. However, the inner focus unit 5 may include one rotation mechanism or three or more rotation mechanisms.

In the present embodiment, the ETL is adopted as the variable-focus optical system 11. However, a wavefront modulation element, such as a deformable mirror or a liquid crystal on silicon (LCOS), may be adopted in place of the ETL Although the microscope body 4 is attached to the gate-type structure member 2 in the present embodiment, the configuration of detachably attaching the microscope body 4 to the revolver attaching unit 17 of a normal microscope may be adopted instead.

In the present embodiment, the inner focus unit 5 is attached using the dovetail portion of the revolver attaching unit 17 provided in the revolver arm 16, and when the revolver is attached thereto, the variable-focus optical system 11 is disposed at the position where the pupil of the objective lens is located.

Instead of the above configuration, the inner focus unit 5 may be detachably attached to an objective lens attaching unit for detachably attaching the objective lens to the revolver.

Figure 2:
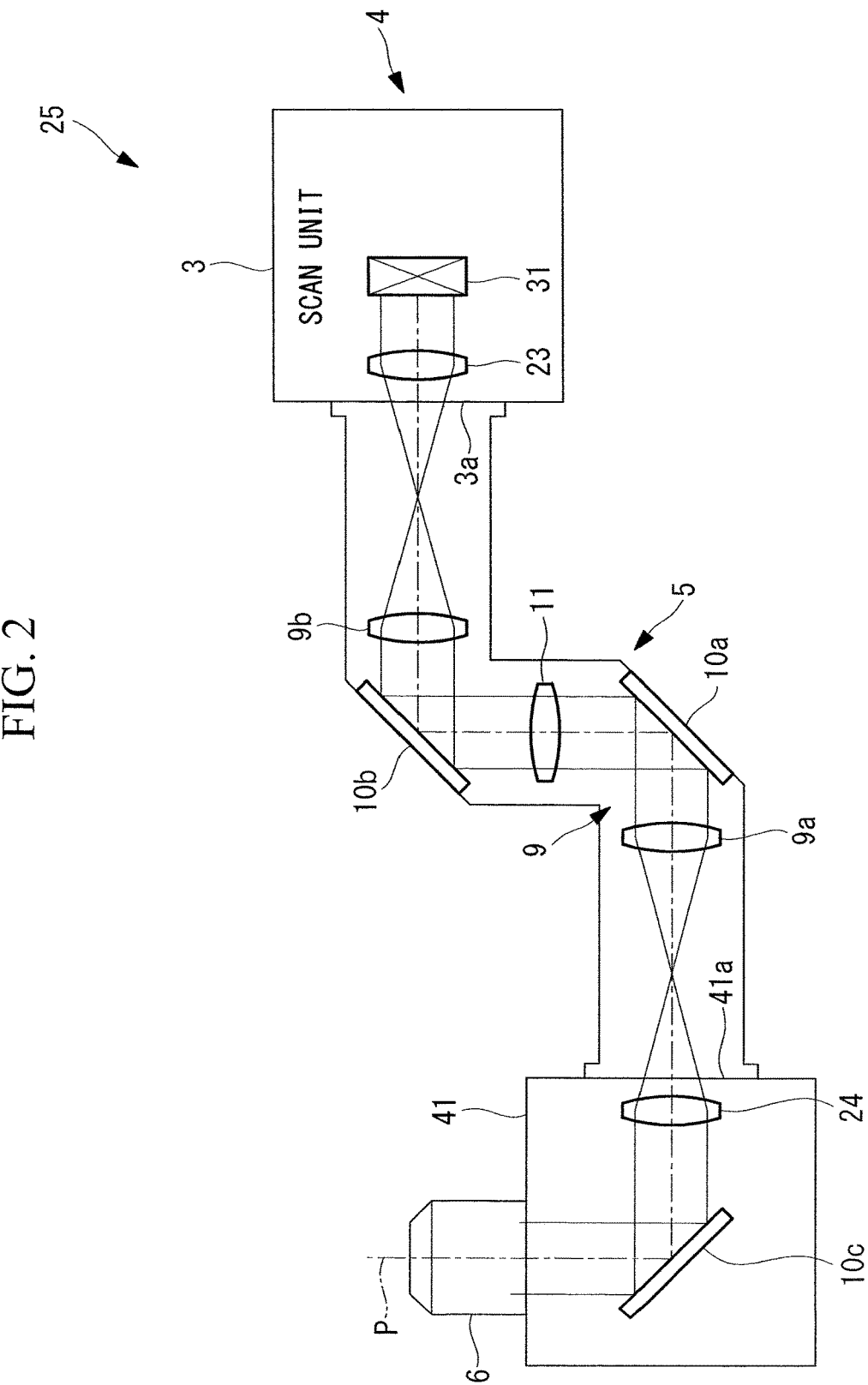
FIG. 2 is a fragmental schematic configuration diagram illustrating a first modification of the microscope of FIG. 1.

As illustrated in FIG. 2, an inverted microscope (microscope) 25 may have a microscope body 4 including a mirror base 41 formed of a casing separate from the scan unit 3. The inner focus unit 5 may detachably be attached between the scan unit 3 and the mirror base 41. In this case, the scan unit 3 of the microscope body 4 includes a pupil projection lens 23 and an optical deflector (for example, a galvano scanner or the like) 31 disposed at a position that is the focal position of the pupil projection lens 23 and is optically conjugate to the pupil of the objective optical system 6.

The inner focus unit 5 is disposed between the scan unit 3 and the mirror base 41 so as to be connected to a port portion 3a of the scan unit 3 and a port portion 41a of the mirror base 41. Accordingly, as illustrated in FIG. 2, the variable-focus optical system 11 of the inner focus unit 5 is disposed between the pupil projection lens 23 and a tube lens 24 that forms an image of the fluorescent light condensed by the objective optical system 6 of the general inverted microscope 25 together with the relay optical system 9 constituted of a pair of relay lenses 9a and 9b. The variable-focus optical system 11 is disposed at a position between the relay lenses 9a and 9b, the position being optically conjugate to the pupil of the objective optical system 6. In the drawing, reference sign 10c designates a reflective mirror that reflects the fluorescent light condensed by the objective optical system 6 to the tube lens 24.

As a consequence, the inner focus unit S can be mounted on the general inverted microscope 25, so that the focal position of the objective optical system 6 can be adjusted by the inner focus unit 5. The inner focus unit 5 can also easily be mounted without modifying each component member generally included in the inverted microscope, such as the scan unit 3 and the mirror base 41.

Figure 3:
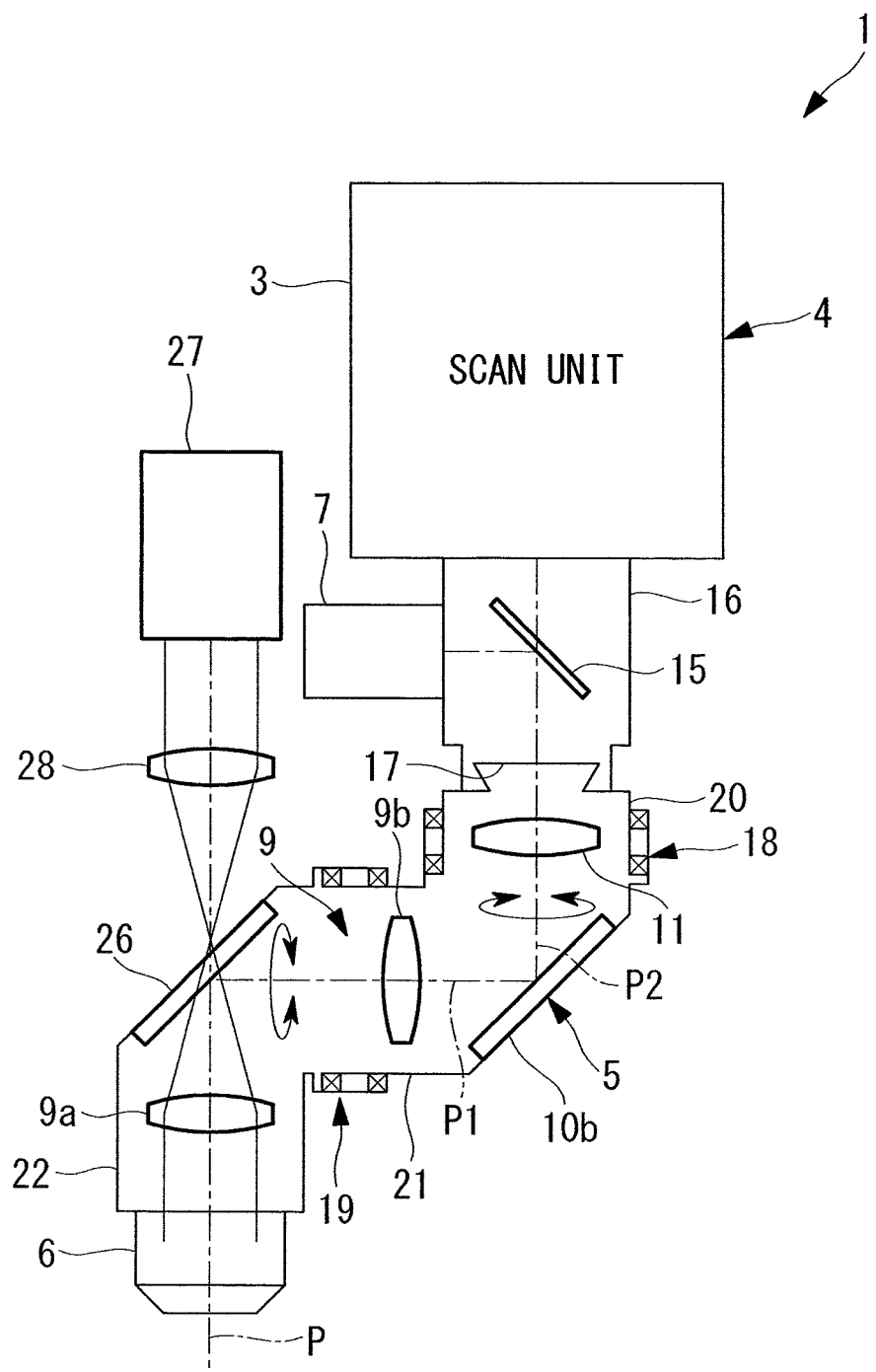
FIG. 3 is a fragmental schematic configuration diagram illustrating a second modification of the microscope of FIG. 1.

As illustrated in FIG. 3, the reflective mirror 10a disposed at a position in the middle of the relay optical system 9 may be replaced with a dichroic mirror 26, and a photomultiplier 27 may be disposed at a position optically conjugate to the pupil position of the objective optical system 6. Such configuration makes it possible to detect the fluorescent light at the position close to the objective optical system 6 in the case of observing the fluorescent light by multiphoton excitation. As a result, a brighter fluorescent light image can be acquired. In the drawing, reference sign 28 designates a condensing lens that condenses the fluorescent light from the sample S.

Figure 4:
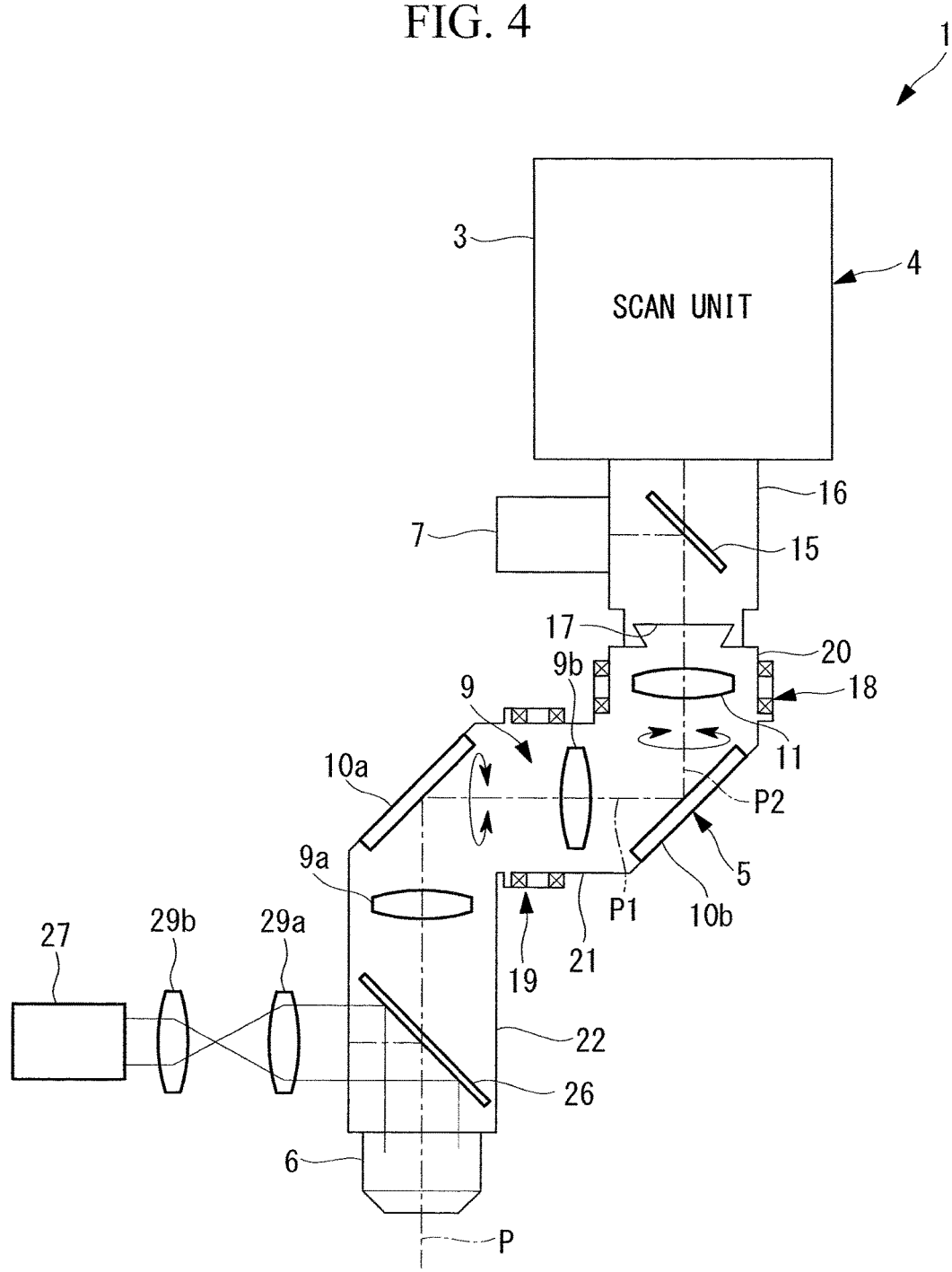
FIG. 4 is a fragmental schematic configuration diagram illustrating a third modification of the microscope of FIG. 1.

As illustrated in FIG. 4, the dichroic mirror 26 may be disposed immediately after the objective optical system 6, and the photomultiplier 27 may be disposed at a position optically conjugate to the pupil position of the objective optical system 6. Such configuration makes it possible to detect the fluorescent light at the position close to the objective optical system 6 in the case of observing the fluorescent light by multiphoton excitation. As a result, a brighter fluorescent light image can be acquired. In the drawing, reference signs 29a and 29b designate relay lenses that relay the fluorescent light from the sample S.

Figure 5:
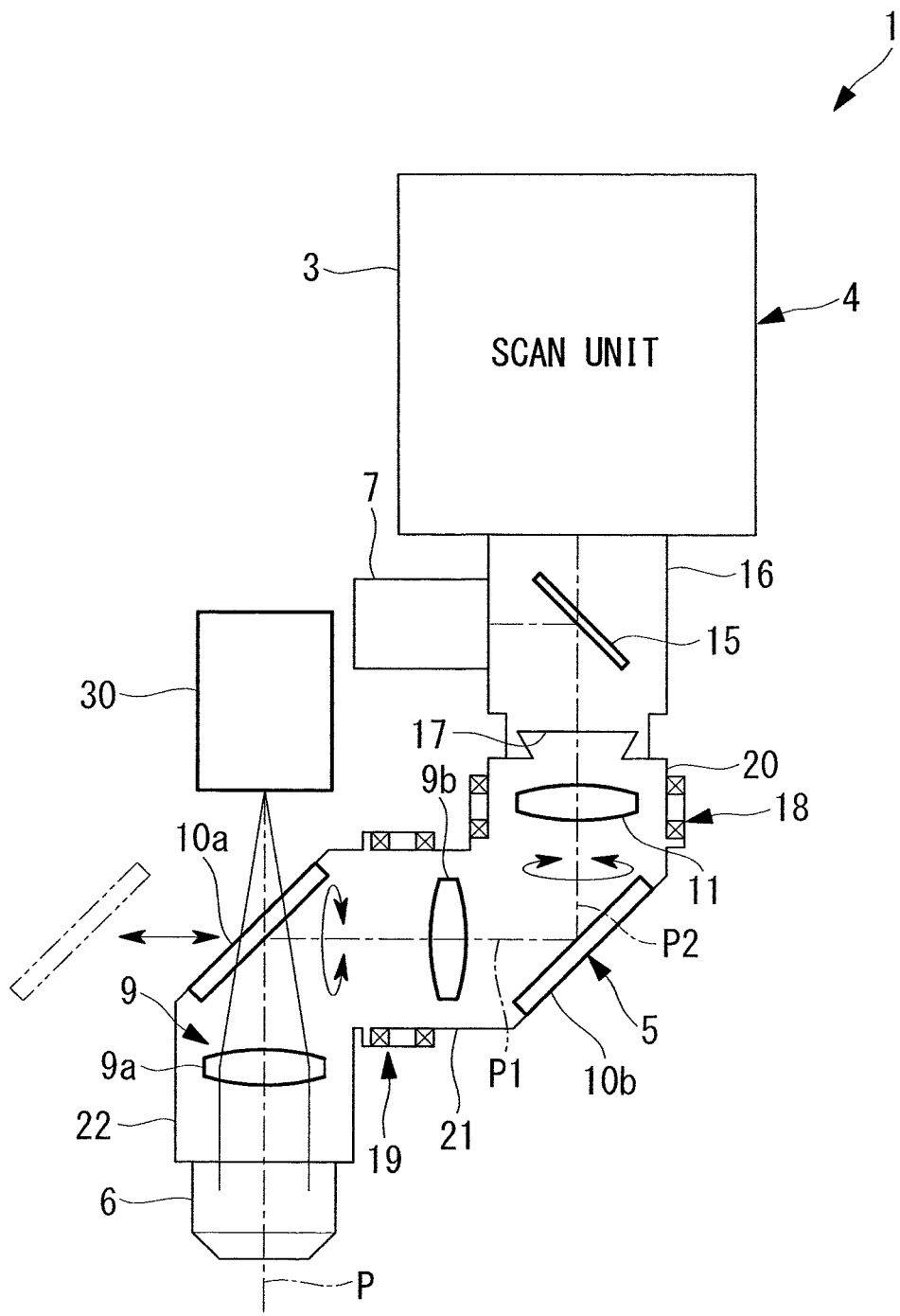
FIG. 5 is a fragmental schematic configuration diagram illustrating a fourth modification of the microscope of FIG. 1.

As illustrated in FIG. 5, the reflective mirror 10a disposed at the position in the middle of the relay optical system 9 may be configured to be detachable, and a two-dimensional imaging element 30, such as a CCD or CMOS imaging device, may be disposed at a position optically conjugate to an image of the relay optical system 9. Accordingly, the reflective mirror 10a is separated from the optical axis, and outside light that reflects from the sample S is imaged by the two-dimensional imaging element 30. This makes it possible to facilitate positioning for coinciding the focal position of the objective optical system 6 with a position of interest. After the positioning is finished, the reflective mirror 10a can be placed on the optical axis, so that observation of fluorescent light can be performed.

From the above-described embodiment, the following invention is derived.

One aspect of the present invention provides a microscope including: an objective optical system that condenses light from a sample; a relay optical system that relays the light condensed by the objective optical system; a photodetector that detects the light coming from the objective optical system and relayed by the relay optical system; and a variable-focus optical system disposed at a position between the photodetector and the objective optical system, the position being optically conjugate to a pupil of the objective optical system, the variable-focus optical system being capable of changing a focal position of the objective optical system in a direction along an objective optical axis.

According to the present aspect, the light from the sample condensed by the objective optical system is relayed by the relay optical system. The light then passes through the variable-focus optical system, and is detected by the photodetector. The variable-focus optical system is operated to change the focal position of the objective optical system in the direction along the objective optical axis. As a result, the light from different depth positions in the sample can be detected by the photodetector.

In this case, since the variable-focus optical system is disposed at the position optically conjugate to the pupil position of the objective optical system, the visual field range can be kept unchanged even when the variable-focus optical system is operated to change the focal position. Accordingly, positions of the sample different in depth direction can be observed without changing the visual field range.

In the above aspect, the microscope may include a microscope body, and an inner focus unit detachably attached to the microscope body, the inner focus unit having the objective optical system attached to a tip thereof. The inner focus unit may include the relay optical system and the variable-focus optical system.

Such configuration can constitute a microscope, in which the inner focus unit having the objective optical system attached to the tip thereof is attached to the microscope body, so that the light condensed by the objective optical system is relayed by the relay optical system, and the variable-focus optical system is disposed at the position optically conjugate to the pupil of the objective optical system.

In the above aspect, the microscope body may include a revolver attaching unit for detachably attaching a revolver, the revolver variably retaining a plurality of objective lenses. The inner focus unit may detachably be attached to the revolver attaching unit, and the variable-focus optical system may be provided at a position located at a pupil position of the objective lens retained by the revolver when the revolver is attached to the revolver attaching unit.

Such configuration makes it possible to detach the revolver from the revolver attaching unit of an existing microscope and to attach the inner focus unit in place of the revolver. As a result, the variable-focus optical system can easily be disposed at the position optically conjugate to the pupil of the objective optical system attached to the tip of the inner focus unit.

In the above aspect, the microscope body may include a revolver that variably and detachably retains a plurality of objective lenses, the inner focus unit may be detachably attached to an objective lens attaching unit of the revolver, and the variable-focus optical system may be provided at a position located at a pupil position of the objective lens retained by the revolver when the objective lens is attached to the objective lens attaching unit.

Such configuration makes it possible to detach any one of the objective lenses from the objective lens attaching unit provided in the revolver of an existing microscope, and to attach the inner focus unit in place of the detached objective lens. As a result, the variable-focus optical system can easily be disposed at the position optically conjugate to the pupil of the objective lens attached to the tip of the inner focus unit.

In the above aspect, the microscope may include a tube lens that condenses the light from the sample; and a pupil projection lens that converts the light condensed by the tube lens into substantially parallel light. The relay optical system may include a pair of relay lenses disposed between the tube lens and the pupil projection lens, and the variable-focus optical system may be disposed between the relay lenses.

In such configuration, the light from the sample condensed by the objective optical system forms an intermediate image with the tube lens, and then the light is relayed by the pair of relay lenses which constitute the relay optical system. The relayed light is condensed by the pupil projection lens, and is detected by the photodetector. In this case, the light passes through the variable-focus optical system at the position optically conjugate to the objective optical system formed at the position of the substantially parallel light that is formed between the pair of relay lenses. Accordingly, positions of the sample different in depth can be observed by changing the focal length without causing change in the visual field range.

In the above aspect, the inner focus unit may include one or more rotation mechanisms that change a position and/or a direction of the optical axis of the objective optical system attached to the tip thereof.

In such configuration, different positions of the sample can easily be observed by operating the rotation mechanism to change the position of the optical axis of the objective optical system. The sample can also be observed from different angles by changing the direction of the optical axis of the objective optical system.

In the above aspect, the microscope may be a gate-type microscope.

Such configuration makes it possible to secure the space wide enough to prevent the inner focus unit from interfering surrounding structures when the inner focus unit operates for the microscope body.

In the above aspect, the variable-focus optical system may be an ETL, and the ETL may be disposed so as to maintain an optical axis direction of the ETL in a vertical direction.

In such configuration, the optical axis of the ETL that constitutes the variable-focus optical system can be maintained in a vertical direction. Accordingly, change in direction of gravity applied to the ETL can be avoided, so that generation of aberration can be suppressed.

In the above aspect, the microscope may be a two-photon laser scanning microscope, a laser scanning microscope, or a disk scanning confocal microscope.

The invention claimed is:

1. A microscope comprising:
an objective optical system that condenses light from a sample;
a relay optical system that relays the light condensed by the objective optical system;
a photodetector that detects the light coming from the objective optical system and relayed by the relay optical system;
a variable-focus optical system disposed at a position between the photodetector and the objective optical system, the position being optically conjugate to a pupil of the objective optical system, and the variable-focus optical system being capable of changing a focal position of the objective optical system in a direction along an objective optical axis;
a microscope body; and
an inner focus unit detachably attached to the microscope body, the inner focus unit having the objective optical system attached to a tip thereof,
wherein:
the inner focus unit includes the relay optical system and the variable-focus optical system,
the microscope body includes a revolver attaching unit for detachably attaching a revolver, the revolver variably retaining a plurality of objective lenses, and
the inner focus unit is detachably attached to the revolver attaching unit, and the variable-focus optical system is provided at a position located at a pupil position of an objective lens retained by the revolver when the revolver is attached to the revolver attaching unit.

2. The microscope according to claim 1, wherein the inner focus unit includes one of more rotation mechanisms that change at least one of a position and a direction of the objective optical axis of the objective optical system attached to the tip thereof.

3. The microscope according to claim 2, wherein the microscope is a gate-type microscope.

4. The microscope according to claim 1, wherein:
the variable-focus optical system is an electrically tunable lens (ETL), and
the ETL is disposed so as to maintain an optical axis direction of the ETL in a vertical direction.

5. The microscope according to claim 1, wherein the microscope is a two-photon laser scanning microscope, a laser scanning microscope, or a disk scanning confocal microscope.

6. A microscope comprising:
an objective optical system that condenses light from a sample;
a relay optical system that relays the light condensed by the objective optical system;
a photodetector that detects the light coming from the objective optical system and relayed by the relay optical system;
a variable-focus optical system disposed at a position between the photodetector and the objective optical system, the position being optically conjugate to a pupil of the objective optical system, and the variable-focus optical system being capable of changing a focal position of the objective optical system in a direction along an objective optical axis;
a microscope body; and
an inner focus unit detachably attached to the microscope body, the inner focus unit having the objective optical system attached to a tip thereof,
wherein:
the inner focus unit includes the relay optical system and the variable-focus optical system,
the microscope body includes a revolver that variably and detachably retains a plurality of objective lenses, and
the inner focus unit is detachably attached to an objective lens attaching unit of the revolver, and the variable-focus optical system is provided at a position located at a pupil position of an objective lens retained by the revolver when the objective lens is attached to the objective lens attaching unit.

7. The microscope according to claim 6, wherein the inner focus unit includes one of more rotation mechanisms that change at least one of a position and a direction of the objective optical axis of the objective optical system attached to the tip thereof.

8. The microscope according to claim 7, wherein the microscope is a gate-type microscope.

9. The microscope according to claim 6, wherein:
the variable-focus optical system is an electrically tunable lens (ETL), and
the ETL is disposed so as to maintain an optical axis direction of the ETL in a vertical direction.

10. The microscope according to claim 6, wherein the microscope is a two-photon laser scanning microscope, a laser scanning microscope, or a disk scanning confocal microscope.

11. A microscope comprising:
an objective optical system that condenses light from a sample;
a relay optical system that relays the light condensed by the objective optical system;
a photodetector that detects the light coming from the objective optical system and relayed by the relay optical system;
a variable-focus optical system disposed at a position between the photodetector and the objective optical system, the position being optically conjugate to a pupil of the objective optical system, and the variable-focus optical system being capable of changing a focal position of the objective optical system in a direction along an objective optical axis;
a tube lens that condenses the light from the sample; and
a pupil projection lens that converts the light condensed by the tube lens into substantially parallel light, wherein:
the relay optical system includes a pair of relay lenses disposed between the tube lens and the pupil projection lens, and
the variable-focus optical system is disposed between the relay lenses.

12. The microscope according to claim 11, wherein:
the variable-focus optical system is an electrically tunable lens (ETL), and
the ETL is disposed so as to maintain an optical axis direction of the ETL in a vertical direction.

13. The microscope according to claim 11, wherein the microscope is a two-photon laser scanning microscope, a laser scanning microscope, or a disk scanning confocal microscope.

14. A microscope comprising:
an objective optical system that condenses light from a sample;
a relay optical system that relays the light condensed by the objective optical system;
a photodetector that detects the light coming from the objective optical system and relayed by the relay optical system;
a variable-focus optical system disposed at a position between the photodetector and the objective optical system, the position being optically conjugate to a pupil of the objective optical system, and the variable-focus optical system being capable of changing a focal position of the objective optical system in a direction along an objective optical axis;
a microscope body; and
an inner focus unit detachably attached to the microscope body, the inner focus unit having the objective optical system attached to a tip thereof,
wherein:
the inner focus unit includes the relay optical system and the variable-focus optical system, and
the inner focus unit includes one or more rotation mechanisms that change at least one of a position and a direction of the objective optical axis of the objective optical system attached to the tip thereof.

15. The microscope according to claim 14, wherein the microscope is a gate-type microscope.

16. The microscope according to claim 14, wherein:
the variable-focus optical system is an electrically tunable lens (ETL), and
the ETL is disposed so as to maintain an optical axis direction of the ETL in a vertical direction.

17. The microscope according to claim 14, wherein the microscope is a two-photon laser scanning microscope, a laser scanning microscope, or a disk scanning confocal microscope.

* * * * *